J. L. R. HAYDEN.
ELECTROLYTE FOR ELECTROLYTIC CELLS.
APPLICATION FILED MAR. 4, 1908.
996,583.
Patented June 27, 1911.
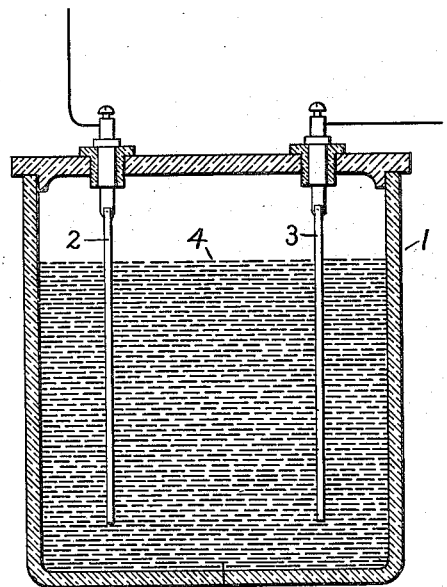
Solution of
Ammonium Octoborate
Witnesses:
J. Earl Ryan
J. Ellis Glen
Inventor:
Joseph L. R. Hayden,
by
Att'y.

UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

ELECTROLYTE FOR ELECTROLYTIC CELLS.

996,583. Specification of Letters Patent. Patented June 27, 1911.

Application filed March 4, 1908. Serial No. 419,095.

*To all whom it may concern:*

Be it known that I, JOSEPH L. R. HAYDEN, a citizen of the United States, residing at Schenectady, in the county of Schenectady, State of New York, have invented certain new and useful Improvements in Electrolytes for Electrolytic Cells, of which the following is a specification.

This invention concerns the employment in electrolytic cells of an electrolyte which insures an efficient operation at relatively high voltages, with moderate temperature rise and without appreciable deterioration of the electrodes or the electrolyte itself.

The electrolyte consists essentially of a solution of ammonium octoborate. The addition of glycerin or milk sugar is advantageous to reduce to a minimum the corrosion of the material of the electrodes.

The accompanying sketch shows a typical form of cell.

In the drawing is represented a container 1, which may be of glass or porcelain, inside of which two electrodes 2 and 3 are suspended in a fluid electrolyte 4. The electrolyte, as is well known, serves not only as a conducting medium but is capable of producing upon the surface of one or both electrodes an extremely thin film. This film is presumed to consist of an oxidation product of the material used for the electrodes. A cell containing two of the film-forming electrodes possesses all the properties of a static electrical condenser. The films serve as dielectrics and, as in the case of ordinary condensers, they hold the static charge. Should the condenser be subjected to excessive voltages and the film break down, the points of breakdown are quickly and automatically repaired by the action of the electrolyte in reforming the film. If one electrode is made of some material capable of forming such a film, as aluminum, and the other of some inert material as carbon, and a current is sent from the active electrode through the liquid to the inert electrode, the formation of this film will very soon check the flow of the current. A current sent in the opposite directions, that is, through the electrolyte from the inert electrode, as carbon, to the active electrode as aluminum, will at once dissolve off the film on the active electrode if one already exists, but as no film is formed on the inert electrode the current will continue to pass. The cell may thus serve as a current valve. As the effectiveness of the electrolytic device depends upon the formation and maintenance of the film, and this in turn upon the peculiar action of the electrolyte, it is important to secure the most effective electrolyte. Various electrolytes have been used in this connection. Some are objectionable because they attack the film or metal electrodes when the apparatus is not in use; others are unsatisfactory because the composition, growth, or structure of the film is such that the voltage which may be applied to the terminals of the cell, without breaking down the dielectric strength of the film, is not as great as may be desired.

The electrolyte which I propose combines the advantages of allowing an operation of the cell at high voltages with but moderate temperature rise, and that of reducing to a minimum the deterioration of the metal electrodes and of the electrolyte itself.

The ammonium octoborate is prepared by dissolving boric acid, $H_3BO_3$, in distilled water to form an 8 to 10 per cent. solution. This solution is mixed with an excess of ammonia solution containing about 25% $NH_4OH$. The resulting solution is evaporated on a water bath to dryness and until all ammonia smell has disappeared. By this treatment the ammonia and boric acid combine and are converted to ammonium octoborate $B_8O_{13}(NH_4)_2$, the most stable form of borate.

The proportions which I have found most desirable in making up my electrolyte are 10% octoborate of ammonium, 10% concentrated glycerin, and 80% water. This is just about a saturated solution of octoborate.

I find that the addition of glycerin still further reduces the action of the electrolyte in deteriorating the electrode plates. As the chemistry of the subject is not well understood, I am unable to explain this action on the part of the glycerin. The glycerin may be replaced by milk sugar. Milk sugar is better suited than ordinary sugar, as the ordinary sugar is more liable to ferment, break up, or carbonize because of its aldehyde character.

What I claim as new and desire to secure by Letters Patent of the United States, is,—

1. In an electrolytic cell, the combination of electrodes, and an electrolyte consisting essentially of a solution of ammonium octoborate.

2. In an electrolytic cell, the combination of electrodes, and an electrolyte consisting of a solution of ammonium octoborate and an organic substance.

3. In an electrolytic cell, the combination of electrodes, and an electrolyte consisting of a solution of ammonium octoborate and glycerin.

4. In an electrolytic condenser, the combination of aluminum electrodes, and an electrolyte separating said electrodes and consisting of a substantially neutral solution of ammonium octoborate.

In witness whereof, I have hereunto set my hand this 26th day of February, 1908.

JOSEPH L. R. HAYDEN.

Witnesses:
 HELEN ORFORD,
 BENJAMIN B. HULL.